(12) United States Patent
Wei et al.

(10) Patent No.: US 11,226,238 B2
(45) Date of Patent: Jan. 18, 2022

(54) BLACKBODY RADIATION SOURCE

(71) Applicants: Tsinghua University, Beijing (CN);
HON HAI PRECISION INDUSTRY CO., LTD., New Taipei (TW)

(72) Inventors: Yang Wei, Beijing (CN); Guang Wang, Beijing (CN); Shou-Shan Fan, Beijing (CN)

(73) Assignees: Tsinghua University, Beijing (CN);
HON HAI PRECISION INDUSTRY CO., LTD., New Taipei (TW)

( * ) Notice: Subject to any disclaimer, the term of this patent is extended or adjusted under 35 U.S.C. 154(b) by 113 days.

(21) Appl. No.: 16/244,481

(22) Filed: Jan. 10, 2019

(65) Prior Publication Data
US 2020/0025625 A1     Jan. 23, 2020

(51) Int. Cl.
*G01J 5/52* (2006.01)
*G01J 5/00* (2006.01)

(52) U.S. Cl.
CPC ....... *G01J 5/522* (2013.01); *G01J 2005/0048* (2013.01)

(58) Field of Classification Search
CPC .......... G01J 5/522; G01J 5/0225; G01J 5/023; G01J 2005/0048; B82Y 30/00; B82Y 40/00; C01B 2202/08
See application file for complete search history.

(56) References Cited

U.S. PATENT DOCUMENTS

| 7,354,877 B2 * | 4/2008 | Rosenberger | B32B 5/26 |
| | | | 442/194 |
| 8,741,422 B2 | 6/2014 | Miao | |
| 8,828,749 B2 * | 9/2014 | Damon | B82Y 35/00 |
| | | | 438/17 |
| 9,067,791 B2 * | 6/2015 | Kim | B82Y 30/00 |
| 9,630,849 B2 * | 4/2017 | Wei | B32B 15/00 |

(Continued)

FOREIGN PATENT DOCUMENTS

| CN | 2622629 | 6/2004 |
| CN | 101400198 | 4/2009 |

(Continued)

OTHER PUBLICATIONS

Shimizu et al., Blackbody Thermal Radiator with Vertically Alighned Carbon Nanotube Coating, Japanese Journal of Applied Physics, May 15, 2014, 068004-1~068004-3.

(Continued)

*Primary Examiner* — Wyatt A Stoffa
(74) *Attorney, Agent, or Firm* — ScienBiziP, P.C.

(57) ABSTRACT

The present invention relates to a blackbody radiation source. The blackbody radiation source comprises a blackbody radiation cavity and a carbon nanotube structure. The blackbody radiation cavity comprises an inner surface. The carbon nanotube structure is located on the inner surface. The carbon nanotube structure comprises a first carbon nanotube layer in contact with the inner surface, a second carbon nanotube layer located on a surface of the first carbon nanotube layer and a third carbon nanotube layer located between the first carbon nanotube layer and the second carbon nanotube layer. The first carbon nanotube layer and the second carbon nanotube layer are fixed together by the third carbon nanotube layer.

19 Claims, 4 Drawing Sheets

(56) References Cited

U.S. PATENT DOCUMENTS

| | | | |
|---|---|---|---|
| 9,833,772 B2* | 12/2017 | Cola | B01J 23/72 |
| 9,964,783 B2* | 5/2018 | Huynh | B32B 27/00 |
| 10,125,022 B2* | 11/2018 | Misra | B82Y 40/00 |
| 10,260,953 B2* | 4/2019 | Engelbart | G01N 25/72 |
| 10,392,127 B2* | 8/2019 | Kruckenberg | B64D 45/02 |
| 10,571,339 B2* | 2/2020 | Wei | G01J 5/023 |
| 2007/0134599 A1* | 6/2007 | Raravikar | B82Y 30/00 430/325 |
| 2008/0192797 A1* | 8/2008 | Ko | G05D 23/19 374/2 |
| 2009/0085461 A1 | 4/2009 | Feng et al. | |
| 2009/0096348 A1 | 4/2009 | Liu et al. | |
| 2009/0135042 A1* | 5/2009 | Umishita | H05K 9/0083 342/1 |
| 2009/0321420 A1 | 12/2009 | Feng et al. | |
| 2010/0021736 A1* | 1/2010 | Slinker | H01L 21/4871 428/408 |
| 2010/0068461 A1* | 3/2010 | Wallace | B81C 1/00111 428/156 |
| 2010/0075024 A1* | 3/2010 | Ajayan | C08K 7/24 427/66 |
| 2011/0108545 A1 | 5/2011 | Wang et al. | |
| 2011/0217451 A1 | 9/2011 | Veerasamy | |
| 2011/0241536 A1* | 10/2011 | Ajayan | C08K 7/24 313/498 |
| 2011/0315882 A1 | 12/2011 | Hu et al. | |
| 2012/0021164 A1* | 1/2012 | Sansom | B29C 70/64 428/95 |
| 2012/0104213 A1 | 5/2012 | Feng et al. | |
| 2012/0107597 A1* | 5/2012 | Kim | B82Y 30/00 428/292.1 |
| 2012/0312773 A1 | 12/2012 | Cheng et al. | |
| 2012/0321961 A1* | 12/2012 | Yushin | B82Y 40/00 429/231.8 |
| 2013/0137324 A1* | 5/2013 | Tang | C09D 5/006 442/131 |
| 2013/0190442 A1* | 7/2013 | Mezghani | B82Y 30/00 524/496 |
| 2013/0200300 A1* | 8/2013 | Do | C09D 7/62 252/75 |
| 2013/0200310 A1* | 8/2013 | Rudhardt | B82Y 40/00 252/502 |
| 2013/0273257 A1* | 10/2013 | Endoh | C09D 11/30 427/427.4 |
| 2013/0295320 A1* | 11/2013 | Liu | B32B 5/12 428/113 |
| 2014/0037895 A1* | 2/2014 | Jiang | H01J 9/025 428/119 |
| 2014/0061453 A1* | 3/2014 | Hagopian | G01J 1/0214 250/237 R |
| 2014/0332673 A1* | 11/2014 | Lehman | G01J 5/20 250/216 |
| 2015/0048249 A1* | 2/2015 | Hedler | H01L 35/00 250/338.4 |
| 2015/0367557 A1 | 12/2015 | Wei et al. | |
| 2016/0279995 A1* | 9/2016 | Langos | B41J 2/4753 |
| 2017/0029275 A1* | 2/2017 | Starkovich | C01B 32/168 |
| 2017/0120220 A1* | 5/2017 | Watanabe | B65B 57/00 |
| 2017/0183514 A1* | 6/2017 | Benac | C09C 1/28 |
| 2017/0283262 A1* | 10/2017 | Humfeld | C01B 32/16 |
| 2018/0145331 A1* | 5/2018 | Yushin | H01M 4/583 |
| 2018/0179391 A1* | 6/2018 | Bahlawane | C09D 7/70 |
| 2018/0210238 A1* | 7/2018 | Huynh | B32B 15/00 |
| 2018/0346157 A1* | 12/2018 | Werth | F02K 9/58 |
| 2019/0374974 A1* | 12/2019 | Yoshida | H01B 1/04 |
| 2020/0316916 A1* | 10/2020 | Morita | B05D 7/57 |

FOREIGN PATENT DOCUMENTS

| | | |
|---|---|---|
| CN | 101409961 | 4/2009 |
| CN | 102452647 | 5/2012 |
| CN | 103382023 | 11/2013 |
| CN | 103602132 | 2/2014 |
| CN | 105197875 | 12/2015 |
| CN | 105562307 | 5/2016 |
| CN | 105675143 | 6/2016 |
| CN | 107014494 | 8/2017 |
| JP | 2015-203589 | 11/2015 |
| JP | 2017-3565 | 1/2017 |
| JP | 2017-24942 | 2/2017 |
| TW | 200834046 | 8/2008 |
| TW | 201125419 | 7/2011 |
| TW | 201144217 | 12/2011 |
| TW | 201250720 | 12/2012 |
| TW | I410615 | 10/2013 |
| TW | I486090 | 5/2015 |
| TW | 201625937 | 7/2016 |
| WO | 2016/107883 | 7/2016 |

OTHER PUBLICATIONS

Lim Zhi Han, Investigation of Laser-Carbon Nanotubes Interaction and Development of CNT-Based Devices, Ph.D Theses, Oct. 12, 2010, Check(https://scholar.google.com/scholar?as_q=&as_epq=Investigation of Laser-Carbon Nanotubes Interaction and Development of CNT-Based Devices&as_occt=any).

Kohei Mizuno et al., A Black Body Absorber from Vertically Aligned Single-walled Carbon Nanotubes, PNAS, Apr. 14, 2009, 6044-6047, vol. 106, No. 15.

Zhao Jun Han et al., Uniform, Dense Arrays of Vertically Aligned, Large-Diameter Single-Walled Carbon Nanotubes, J. Am. Chem. Soc., Mar. 12, 2012, 6018-6024, 134, 13.

Kohei Mizuno et al. A black body absorber from vertically aligned single-walled carbon nanotubes, Proceedings of the Natinal Academy of Sciences, Apr. 14, 2009, vol. 106, 6044-6047.

* cited by examiner

BLACKBODY RADIATION SOURCE

CROSS-REFERENCE TO RELATED APPLICATIONS

This application claims all benefits accruing under 35 U.S.C. § 119 from China Patent Application No. 201810027425.X, filed on Jan. 11, 2018, in the China National Intellectual Property Administration, the contents of which are hereby incorporated by reference. This application is related to applications entitled, "PLANE SOURCE BLACKBODY", filed Ser. No. 16/244,449, "BLACKBODY RADIATION SOURCE", filed Ser. No. 16/244,455, "BLACKBODY RADIATION SOURCE", filed Ser. No. 16/244,468, "BLACKBODY RADIATION SOURCE", filed Ser. No. 16/244,474, "PLANE SOURCE BLACKBODY", filed Ser. No. 16/244,488, "CAVITY BLACKBODY RADIATION SOURCE AND METHOD OF MAKING THE SAME", filed Ser. No. 16/198,549, "CAVITY BLACKBODY RADIATION SOURCE", filed Ser. No. 16/198,565, "PLANE SOURCE BLACKBODY", filed Ser. No. 16/198,577, "CAVITY BLACKBODY RADIATION SOURCE AND METHOD OF MAKING THE SAME", filed Ser. No. 16/198,590, "CAVITY BLACKBODY RADIATION SOURCE AND METHOD FOR MAKING THE SAME", filed Ser. No. 16/198,598, and "PLANE SOURCE BLACKBODY", filed Ser. No. 16/198,606.

FIELD

The present disclosure relates to a blackbody radiation source, especially relates to a cavity blackbody radiation source.

BACKGROUND

With a rapid development of infrared remote sensing technology, the infrared remote sensing technology is widely used in military fields and civilian fields, such as earth exploration, weather forecasting, and environmental monitoring. All infrared detectors need to be calibrated by a blackbody before they can be used. The higher an effective emissivity of the blackbody, the higher a calibration accuracy of infrared detector. Used as a standard radiation source, a role of blackbody is increasingly prominent. An effective emissivity of a cavity blackbody mainly depends on an opening size of the cavity blackbody, a shape of the cavity blackbody, an emissivity of materials on an inner surface of the cavity blackbody and a isothermal degree inside the cavity blackbody. Therefore, to obtain high performance blackbody radiation sources, it is important to use inner surface materials with high emissivity.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the exemplary embodiments. Moreover, in the drawings, like reference numerals designate corresponding parts throughout the several views.

DETAILED DESCRIPTION

Figure 1:
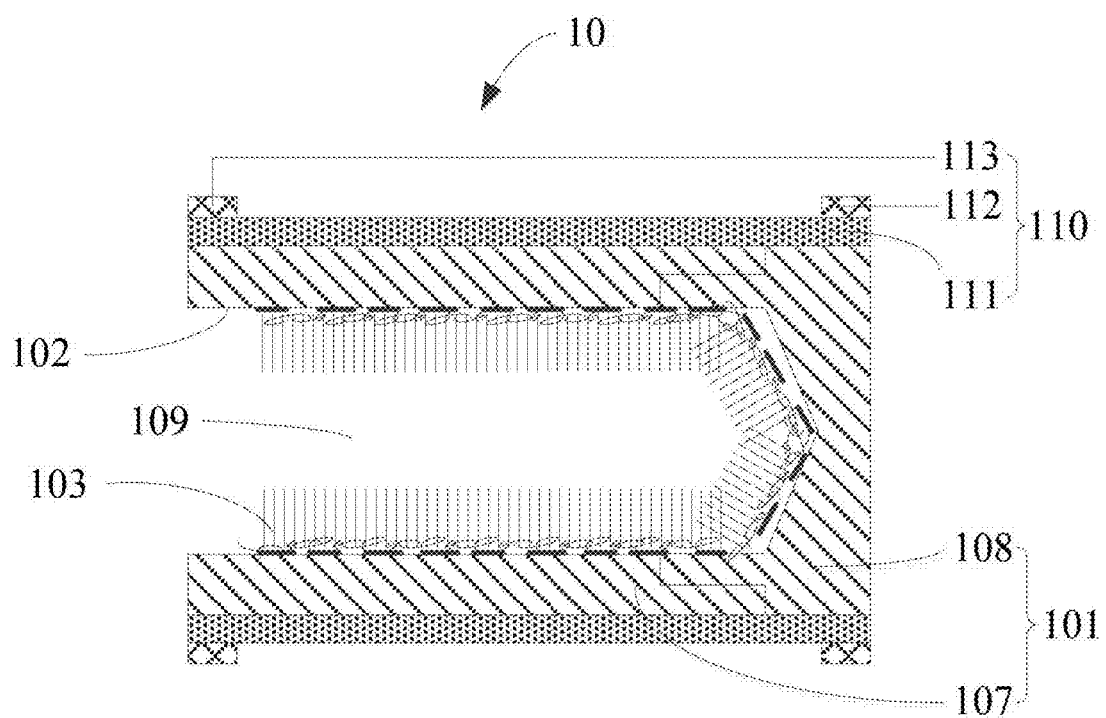
FIG. 1 is a schematic view of a section structure of a blackbody radiation source according to one embodiment.

The disclosure is illustrated by way of embodiment and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "include," when utilized, means "include, but not necessarily limited to"; it specifically indicates open-ended inclusion or membership in the so-described combination, group, series, and the like.

Figure 2:
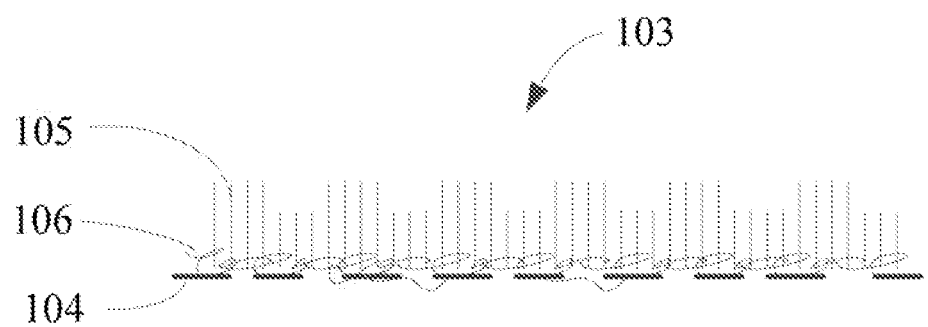
FIG. 2 is a schematic view of a carbon nanotube structure used in one embodiment.

Referring to FIG. 1, a blackbody radiation source 10 is provided according to one embodiment. The blackbody radiation source 10 comprises a blackbody radiation cavity 101. The blackbody radiation cavity 101 comprises an inner surface 102. A carbon nanotube structure 103 is located on the inner surface 102. Referring to FIG. 2, the carbon nanotube structure 103 comprises:

A first carbon nanotube layer 104 located on the inner surface 102, wherein the first carbon nanotube layer 104 comprises a plurality of first carbon nanotubes, and an extending direction of the first carbon nanotube is substantially parallel to the inner surface 102;

A second carbon nanotube layer 105 located on a surface of the first carbon nanotube layer 104, wherein the first carbon nanotube layer 104 is located between the inner surface 102 and the second carbon nanotube layer 105, the second carbon nanotube layer 105 comprises a plurality of second carbon nanotubes, and an extending direction of the second carbon nanotube is substantially perpendicular to the inner surface 102; and A third carbon nanotube layer 106 comprising a plurality of third carbon nanotubes, wherein the plurality of third carbon nanotubes are entangled around both the plurality of first carbon nanotubes and the plurality of second carbon nanotubes.

The first carbon nanotube layer 104 is an integrated macrostructure in a layer shape. The first carbon nanotube layer 104 is a free-standing structure. The term "free-standing structure" implies, but is not limited to, that the first carbon nanotube layer 104 can sustain the weight of itself when it is hoisted by a portion thereof without any significant damage to its structural integrity. The free-standing carbon nanotube layer 104 comprises a plurality of first carbon nanotubes. The plurality of first carbon nanotubes are joined by van der Waals attractive force therebetween to form a free-standing structure of the first carbon nanotube layer 104.

The first carbon nanotube layer 104 defines a plurality of apertures. The apertures can be distributed in the first carbon nanotube layer 104 uniformly. The aperture extends throughout the first carbon nanotube layer 104 along the thickness direction thereof. The aperture can be a hole defined by several adjacent carbon nanotubes, or a gap defined by two substantially parallel carbon nanotubes and extending along axial direction of the carbon nanotubes. The first carbon nanotube layer 104 can comprise the hole shaped aperture and the gap shaped aperture at the same time.

The first carbon nanotube layer 104 can further comprise at least one carbon nanotube film, at least one carbon nanotube wire, or combination thereof. In one embodiment, the first carbon nanotube layer 104 can comprise a layer of parallel and spaced carbon nanotube wires. In addition, the first carbon nanotube layer 104 can comprise a plurality of carbon nanotube wires crossed or weaved together to form a carbon nanotube net. In another embodiment, the first carbon nanotube layer 104 can comprise a single carbon nanotube film or two or more carbon nanotube films stacked together. The carbon nanotubes of the first carbon nanotube layer 104 can be orderly arranged to form an ordered carbon nanotube structure or disorderly arranged to form a disordered carbon nanotube structure. The term 'ordered carbon nanotube structure' includes, but is not limited to, a structure wherein the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions). The term 'disordered carbon nanotube structure' includes, but is not limited to, a structure wherein the carbon nanotubes are arranged along many different directions, and the aligning directions of the carbon nanotubes are random. The number of the carbon nanotubes arranged along each different direction can be almost the same (e.g. uniformly disordered). The disordered carbon nanotube structure can be isotropic. The carbon nanotubes in the disordered carbon nanotube structure can be entangled with each other. In one embodiment, the carbon nanotube film can be a drawn carbon nanotube film, a pressed carbon nanotube film, or a flocculated carbon nanotube film. The carbon nanotube wire can be a twisted carbon nanotube wire or an untwisted carbon nanotube wire.

The second carbon nanotube layer 105 can be a carbon nanotube array located on the surface of the first carbon nanotube layer 104. The carbon nanotube array comprises a plurality of second carbon nanotubes. An extending direction of the second carbon nanotube is substantially perpendicular to the surface of the first carbon nanotube layer 104 and the inner surface 102. A height of the second carbon nanotube ranges from about 200 micrometers to about 900 micrometers. A first portion of the second carbon nanotube adjacent to the first carbon nanotube layer 104 is intertwined with the first carbon nanotube layer 104.

In one embodiment, the second carbon nanotube has an open end, and the open end is far away from the first carbon nanotube layer 104. The open ends of the second carbon nanotubes are not blocked by catalysts particles or something else.

In another embodiment, the second carbon nanotube layer 105 is formed on the first carbon nanotube layer 104 with a pattern. By "patterned", it means that the plurality of second carbon nanotubes of the second carbon nanotube layer 105 partially cover the first carbon nanotube layer 104.

A surface of the second carbon nanotube layer 105 adjacent to the first carbon nanotube layer 104 is defined as a first surface of the second carbon nanotube layer 105, and a surface of the second carbon nanotube layer 105 away from the first carbon nanotube layer 104 is defined as a second surface of the second carbon nanotube layer 105. The plurality of second carbon nanotubes extend from the first surface to the second surface. In one embodiment, a plurality of microstructures are formed on the second surface of the second carbon nanotube layer 105. The plurality of microstructures comprises a plurality of micro-grooves formed on the second surface of the second carbon nanotube layer 105. The micro-groove can be an annular micro-groove, a strip micro-groove, a dot-shaped micro-groove or a spiral micro-groove extending spirally along an axial of the blackbody radiation cavity 101. Cross-sectional shapes of the micro-grooves are not limited, and can be inverted triangles, rectangles, or trapezoids.

It is indicated by existing research that the larger an inner surface area of the blackbody radiation cavity, the higher an emissivity of the blackbody radiation cavity. The plurality of microstructures on the second surface of the second carbon nanotube layer 105 are equivalent to an increase of the inner surface area of the blackbody radiation cavity, therefore the emissivity of the blackbody radiation cavity can be further increased.

The third carbon nanotube layer 106 can be located between the first carbon nanotube layer 104 and the second carbon nanotube layer 105. The third carbon nanotube layer 106 can be a carbon nanotube cluster. The carbon nanotube cluster is a structure like a grass cluster. The carbon nanotube cluster includes a plurality of third carbon nanotubes disorderly arranged and intertwined with each other. The third carbon nanotubes and the first portions of the second carbon nanotubes that are adjacent to the first carbon nanotube layer 104 are entangled with each other and extend around the first carbon nanotubes. Thus, the first carbon nanotube layer 104, the second carbon nanotube layer 105, and the third carbon nanotube layer 106 can form a free standing integrated structure. In one embodiment, the third carbon nanotubes are entangled with both the first carbon nanotubes and the second carbon nanotubes, thus the first carbon nanotubes and the second carbon nanotubes are secured together by the third carbon nanotubes. Each of the third carbon nanotubes has a first part entangled with the first carbon nanotubes and a second part entangled around the second carbon nanotubes. A height of the third carbon nanotube ranges from about 200 micrometers to about 900 micrometers.

In one embodiment, the third carbon nanotube layer 106 is formed on the first carbon nanotube layer 104 with a pattern. The plurality of third carbon nanotubes partially cover the first carbon nanotube layer 104. The pattern formed by the third carbon nanotube layer 106 can be the same as or different from the pattern formed by the second carbon nanotube layer 105.

In one embodiment, a black lacquer layer can be formed between the inner surface 102 and the carbon nanotube structure 103. The black lacquer has high emissivity, such as Pyromark™ 1200 black lacquer having an emissivity of 0.92, Nextel Velvet 811-21 black lacquer having an emissivity of 0.95. The black lacquer is not only a high emissivity material but also function as a glue to keep the carbon nanotube structure 103 fixed on the inner surface 102 tightly. The emissivity of the blackbody radiation source 10 can be improved, the stability of the blackbody radiation source 10 can be enhanced, and the service life of the blackbody radiation source 10 can be prolonged.

The blackbody radiation cavity 101 is made from materials resistant to high temperatures and having high emissivity. The materials can be duralumin, aluminum alloy or oxygen-free copper.

The blackbody radiation cavity 101 comprises a cavity 107 and a cavity bottom 108. The materials of the cavity 107 and the cavity bottom 108 can be same or different. The cavity 107 and the cavity bottom 108 can be an integrally formed structure. The cavity 107 and the cavity bottom 108 can also be two independent structures. The cavity bottom 108 can be pressed or screwed into the cavity 107 from an end opening of the cavity 107.

The blackbody radiation cavity 101 defines a room 109. A cross-sectional shape of the room 109 can be circle, ellipse, triangle, quad, or other polygon. A shape of a bottom surface of the room 109 is not limited. The shape of the bottom surface of the room 109 can be a flat surface, a tapered surface, a prismatic surface, or other surfaces.

The blackbody radiation source 10 can further comprise a heating element 110. The heating element 110 comprises a carbon nanotube structure 111, a first electrode 112 and a second electrode 113. The first electrode 112 and the second electrode 113 are spaced apart from each other on a surface of the carbon nanotube structure 111. The carbon nanotube structure 111 is wrapped or wound around an outer surface of the blackbody radiation cavity 101. The carbon nanotube structure 111 comprises at least one carbon nanotube film or at least one carbon nanotube long wire. The carbon nanotube structure comprises a plurality of carbon nanotubes joined end to end and preferentially oriented along a same direction. The plurality of carbon nanotubes of the carbon nanotube structure 111 extend from the first electrode 112 toward the second electrode 113.

Because the carbon nanotube structure 111 is wrapped or wound around the outer surface of the blackbody radiation cavity 101, after energized by the first electrode 112 and the second electrode 113, the carbon nanotube structure 111 can heat the whole blackbody radiation cavity 101. Therefore a temperature field inside the blackbody radiation cavity 101 can be evenly distributed, and a temperature stability and a temperature stability uniformity of the blackbody radiation source 10 can be improved. Since carbon nanotube has low density and is light, the blackbody radiation source 10 using the carbon nanotube structure as the heating element may be light and compact. The carbon nanotube structure 111 has low electrical resistance, high electrothermal conversion efficiency and low thermal resistivity. So using the carbon nanotube structure 111 to heat the blackbody radiation cavity 101 has the characteristics of rapid temperature rise, small thermal hysteresis and fast heat exchange rate. Carbon nanotube materials have excellent toughness, thus the blackbody radiation source 10 using the carbon nanotube structure 111 as the heating element has a long service life.

In one embodiment, the blackbody radiation cavity 101 is made from an aluminum alloy. The blackbody radiation cavity 101 comprises a cavity 107 and a cavity bottom 108. The cavity 107 and the cavity bottom 108 are two independent structures. The cavity bottom 108 can be screwed into the cavity 107 through threads on the inner surface of the cavity 107. The blackbody radiation cavity 101 defines a room 109. The cross-sectional shape of the room 109 is circle. The shape of the bottom surface of the room 109 is a tapered surface.

Figure 3:
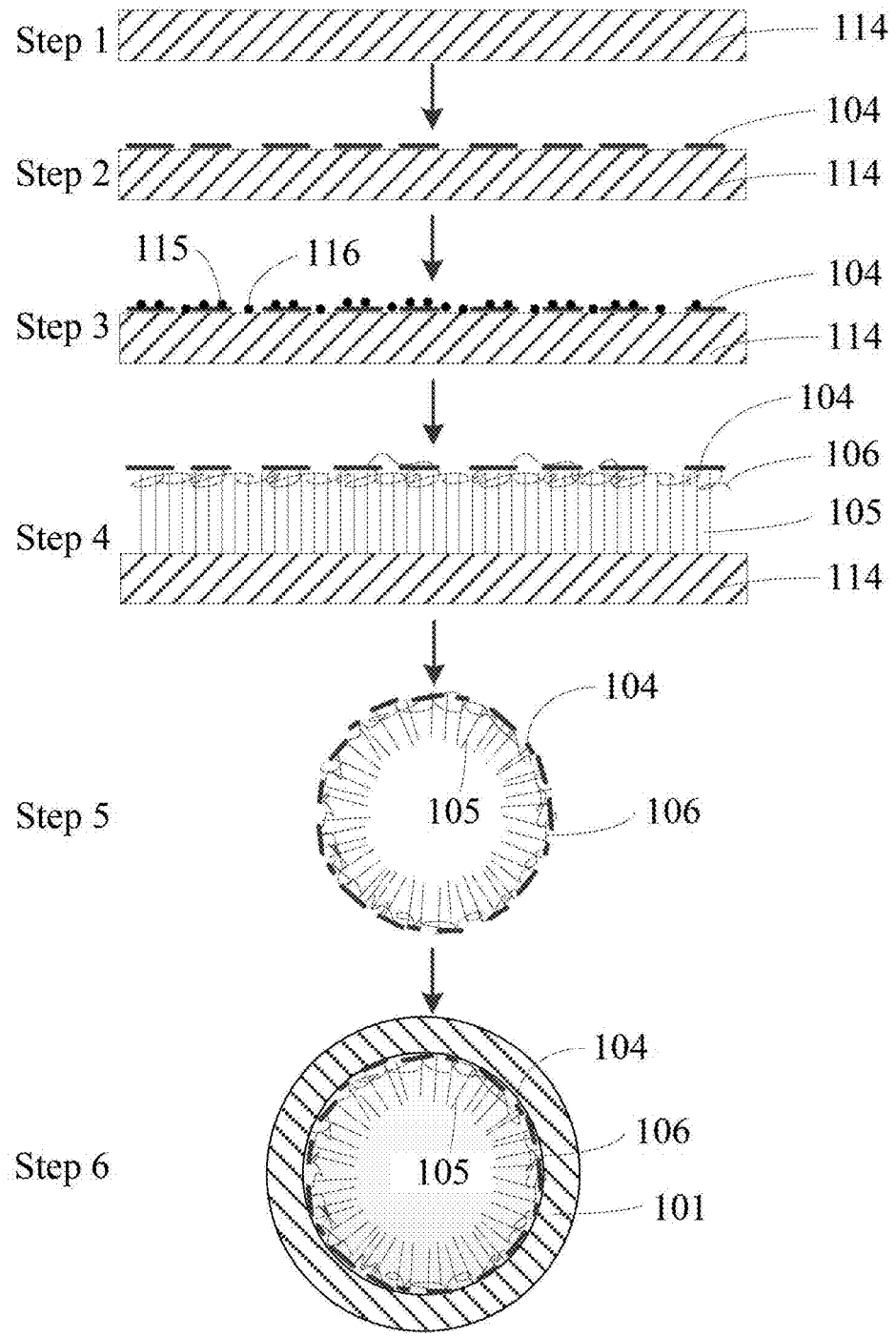
FIG. 3 is a process flowchart of a method for making the blackbody radiation source in FIG. 1 according to one embodiment.

Referring to FIG. 3, a method for making the blackbody radiation source 10 is provided according to one embodiment. The method comprises the following steps:

Step 1, providing a substrate 114 comprising a growing surface;

Step 2, placing a first carbon nanotube layer 104 on the growing surface, wherein part of the growing surface is exposed through the first carbon nanotube layer 104;

Step 3, depositing a plurality of first catalysts 115 on a surface of the first carbon nanotube layer 104 and depositing a plurality of second catalysts 116 on the growing surface;

Step 4, growing a second carbon nanotube layer 105 on the growing surface and growing a third carbon nanotube layer 106 on the surface of the first carbon nanotube layer 104, wherein the first carbon nanotube layer 104, the second carbon nanotube layer 105 and the third carbon nanotube layer 106 form a carbon nanotube structure 103 together;

Step 5, removing the carbon nanotube structure 103 from the substrate 108;

Step 6, providing a blackbody radiation cavity 101 comprising an inner surface 102, and transferring the carbon nanotube structure 103 onto the inner surface 102.

In the step S1, the substrate 114 has a growing surface that is a clean and smooth surface. The growing surface can be flat or curved. The growing surface can be mechanically polished or electrochemically polished. The substrate 114 can be a silicon substrate, a silicon dioxide substrate, a quartz substrate, a sapphire substrate, or a ceramic substrate. The size, thickness, and shape of the substrate 114 can be selected according to need.

In the step S2, the first carbon nanotube layer 104 is placed on the growing surface of the substrate 114. The first carbon nanotube layer 104 is a free-standing structure. The first carbon nanotube layer 104 comprises a plurality of carbon nanotubes joined with each other by van der Waals force.

The first carbon nanotube layer 104 defines a plurality of apertures. The apertures can be dispersed uniformly. The aperture extends throughout the carbon nanotube layer 102 along the thickness direction thereof. The aperture can be a hole defined by several adjacent carbon nanotubes, or a gap defined by two substantially parallel carbon nanotubes and extending along axial direction of the carbon nanotubes. Part of the growing surface of the substrate 114 is exposed through the plurality of apertures. Thus, the plurality of first catalysts 115 are deposited on the surface of the first carbon nanotube layer 104, and the plurality of second catalysts 116 are deposited on the growing surface of the substrate 114 through the plurality of apertures.

Hereafter, a size of the aperture is a diameter of the hole or a width of the gap. The sizes of the apertures can be different. The sizes of the apertures should less than 100 micrometers, so that the carbon nanotube array grown in following step can lift the first carbon nanotube layer 104 up away from the growing surface. When the size of the aperture is too large, the carbon nanotube array grown in following step may grow through the apertures and the first carbon nanotube layer 104 cannot be lifted up. In one embodiment, the size of the aperture is in a range from about 50 nanometers to about 100 nanometers. In order to deposit enough second catalyst 116 on the growing surface, to grow the carbon nanotube array in following step, a duty ratio of the first carbon nanotube layer 104 can be in a range from about 95:5 to about 5:95. For example, the duty ratio of the first carbon nanotube layer 104 can be about 9:1, 8:2, 7:3, 6:4, 5:5, 4:6, 3:7, 2:8 or 1:9. In one embodiment, the duty ratio of the first carbon nanotube layer 104 is in a range from about 1:4 to about 4:1. The duty ratio of the first carbon nanotube layer 104 is an area ratio between the sheltered growing surface and the exposed growing surface.

In the step S3, the catalyst can be deposited by a method of electron beam evaporation, magnetron sputtering, plasma deposition, electro-deposition or thermal deposition. Because the first carbon nanotube layer 104 defines the plurality of apertures, part of the catalyst is deposited on the first carbon nanotube layer 104 to form the first catalyst 115, and the other part of the catalyst is deposited on the growing surface through the apertures to form the second catalyst 116.

A material of the catalyst is a transition metal. Examples of the transitional metal is iron (Fe), cobalt (Co), nickel (Ni), platinum (Pt), palladium (Pd), or mixtures or alloys of those metals mentioned above. A thickness of the catalyst can be in a range from about 1 nanometer to about 10 nanometers. In one embodiment, the thickness of the catalyst ranges from about 1 nanometer to about 5 nanometers.

In one embodiment, the first catalyst 115 and the second catalyst 116 can be a patterned catalyst layer. That is, the first catalyst 115 is only deposited on part of the first carbon nanotube layer 104, and the second catalyst 116 is only deposited on part of the growing surface. A patterned mask can be used to shelter part of the first carbon nanotube layer 104 and the growing surface during a process of depositing catalyst, thereby forming a patterned first catalyst 115 and a patterned second catalyst 116. Thus, a patterned carbon nanotube array and a patterned carbon nanotube cluster can be achieved.

In the step S4, the second carbon nanotube layer 105 is a carbon nanotube array and the third carbon nanotube layer 106 is a carbon nanotube cluster. The carbon nanotube array and the carbon nanotube cluster are grown by the method of chemical vapor deposition.

The substrate 114 with the first carbon nanotube layer 104 thereon is placed into a reacting room. The substrate 114 is heated to a temperature in a range from about 500 to about 900° C. under a protective gas atmosphere, and in one embodiment, the temperature is in a range from about 600 to about 720° C. Then, a mixed gas of carbon source gas and protective gas is introduced into the cavity. The carbon source gas can be acetylene, ethylene, methane, or ethane. The protective gas comprises inert gas or nitrogen. The heating time ranges from about 10 to about 40 minutes. The carbon nanotube array is grown on the second catalyst 116, and the carbon nanotube cluster is grown on the first catalyst 115 simultaneously.

The carbon nanotubes of the carbon nanotube array are grown along a direction vertical to the growing surface of the substrate 114. The carbon nanotube array lifts the first carbon nanotube layer 104 up away from the growing surface. The carbon nanotubes of the carbon nanotube array are almost parallel with each other. The portions of the carbon nanotubes of the carbon nanotube array adjacent to the first carbon nanotube layer 104 are entangled with the carbon nanotubes of the carbon nanotube cluster.

The carbon nanotubes of the carbon nanotube cluster, the carbon nanotubes of the first carbon nanotube layer 104, and the portions of the carbon nanotubes of the carbon nanotube array that are adjacent to the first carbon nanotube layer 104, are entangled with each other. So that the carbon nanotube array, the carbon nanotube cluster, and the first carbon nanotube layer 104 form a free standing and integrated carbon nanotube structure 103. Thus, the carbon nanotube array is firmly fixed on the first carbon nanotube layer 104.

In the step S5, the carbon nanotube array, the carbon nanotube cluster and the first carbon nanotube layer can be removed from the substrate 108 together because they form a free standing integrated structure. In one embodiment, the carbon nanotube structure 103 can be peeled off from the substrate 108 via the first carbon nanotube layer 104 easily.

Figure 4:
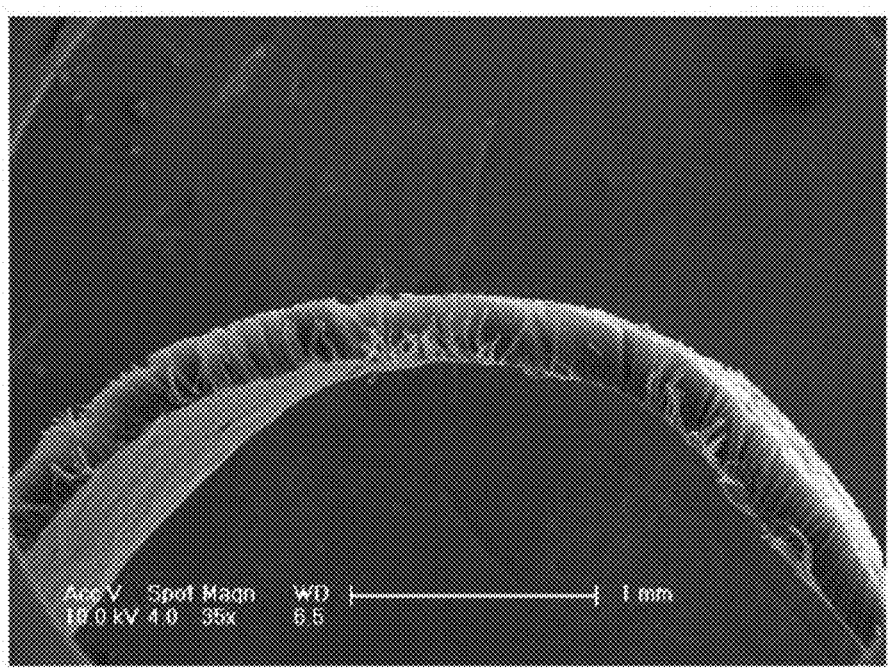
FIG. 4 is a Scanning Electron Microscope (SEM) image of the carbon nanotube structure in one embodiment.

Referring to FIG. 4, a SEM image of the carbon nanotube structure 103 is provided in one embodiment. FIG. 4 shows that the carbon nanotube structure 103 is a free standing integrated structure. The carbon nanotube structure 103 is flexible and can be curved into arc shape.

Furthermore, an optional step of irradiating the carbon nanotube array with a laser beam can be performed after step S5. A laser generator is provided to generate the laser beam. The laser beam is used to irradiate a surface of the carbon nanotube array away from the first carbon nanotube layer 104 to form a plurality of microstructures on the surface of the carbon nanotube array.

During a process of laser irradiation, since a high energy of the laser beam can be absorbed by carbon nanotubes on the paths of the laser beams, the temperature of the carbon nanotubes become high and the carbon nanotubes can react with the oxygen in the air, and then decompose. Thus, the carbon nanotubes on the paths of the laser beams will be removed. In this way, a plurality of microstructures can be formed on the surface of the carbon nanotube array. A scanning path of the laser beam can be set precisely by a computer in advance to form a complex etched pattern on the top surface of the plurality of carbon nanotubes. A direction in which the laser beam is incident can be at an angle to the surface of the carbon nanotube array. In one embodiment, the angle ranges from about 55 degrees to about 90 degrees.

In the step S6, the blackbody radiation cavity 101 is made from an aluminum alloy. The blackbody radiation cavity 101 comprises a cavity and a cavity bottom. The cavity and the cavity bottom are two independent structures. The cavity bottom can be screwed into the cavity through threads on the inner surface of the cavity. The blackbody radiation cavity 101 defines a cylindrical room 107. A shape of a cross sectional structure of the room 107 is circular. A shape of a bottom surface of the room 107 is a tapered surface.

Since the carbon nanotube structure 103 is a free-standing structure of flexibility, the carbon nanotube structure 103 can be rolled into a cylindrical structure directly. The first carbon nanotube layer 104 is located on the outer surface of the cylindrical structure. Then, the cylindrical structure is inserted into the black body radiation cavity 101, and the first carbon nanotube layer 104 is attached to the inner surface 102 of the black body radiation cavity 101.

In one embodiment, a layer of black lacquer can be formed on the inner surface 102 of the blackbody radiation cavity 101 in advance, and then the cylindrical structure formed by the carbon nanotube structure 103 is inserted into the blackbody radiation cavity 101.

The blackbody radiation source provided by the present disclosure has the following characteristics.

Firstly, carbon nanotubes are currently the blackest material in the world. Tiny gaps between carbon nanotubes in a carbon nanotube array can prevent a incident light from being reflected off a surface of the array, so the emissivity of the carbon nanotube array is high. The emissivity of the carbon nanotube array is as high as 99.6% according to a measurement, which is far larger than that of the inner surface materials of the blackbody cavity currently used. For example, the emissivity of Nextel Velvet 81-21 black lacquer is 96%.

Secondly, to obtain a high emissivity, a depth of the blackbody radiation cavity is often increased and a caliber of the blackbody radiation cavity is often reduced. Using carbon nanotube array as the inner surface material of the blackbody radiation cavity according to the present disclosure, the depth of the black body radiation cavity may be reduced with the same effective emissivity of the cavity. Therefore, miniaturization and wide applications of the blackbody radiation sources can be realized.

Thirdly, the carbon nanotubes can be prepared conveniently and quickly by a chemical vapor deposition of carbon source gas under high temperature conditions, and the raw materials are cheap and easy to obtain.

Fourthly, the carbon nanotubes have excellent thermal conductivity. So it can improve the temperature uniformity and the temperature stability of the blackbody radiation source with the carbon nanotube array as the inner surface material of the blackbody radiation cavity.

Fifthly, a carbon nanotube layer and a carbon nanotube array can be fixed together by the plurality of third carbon nanotubes. Thereby the bonding force between the carbon nanotube layer and the carbon nanotube array is improved, and the carbon nanotube array may not easily fall off from the inner surface of the black body radiation source. Thus, the service life of the black body radiation source can be improved.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A blackbody radiation source comprising:
   a blackbody radiation cavity comprising an inner surface;
   a carbon nanotube structure located in the blackbody radiation cavity and on the inner surface comprising:
   a first carbon nanotube layer in contact with the inner surface, wherein the first carbon nanotube layer comprises a plurality of first carbon nanotubes, and an extending direction of the first carbon nanotube is substantially parallel to the inner surface;
   a second carbon nanotube layer on a surface of the first carbon nanotube layer, wherein the first carbon nanotube layer is located between the inner surface and the second carbon nanotube layer, the second carbon nanotube layer comprises a plurality of second carbon nanotubes, and an extending direction of the plurality of second carbon nanotubes is substantially perpendicular to the inner surface, the second carbon nanotube layer comprises a first surface and a second surface, the first surface is located adjacent with the first carbon nanotube layer, the second surface is located away from the first carbon nanotube layer; and
   a third carbon nanotube layer between the first carbon nanotube layer and the second carbon nanotube layer, wherein the third carbon nanotube layer comprises a plurality of third carbon nanotubes, and the plurality of third carbon nanotube are entangled around both the plurality of first carbon nanotubes and the plurality of second carbon nanotubes; and
   a black lacquer layer located between the inner surface and the carbon nanotube structure.

2. The blackbody radiation source of claim 1, wherein a plurality of microstructures are formed on a surface of the second carbon nanotube layer away from the first carbon nanotube layer.

3. The blackbody radiation source of claim 1, wherein the plurality of second carbon nanotubes is oriented from the first surface to the second surface, the second surface comprises a first subsurface and a second subsurface, and the first subsurface faces to the second subsurface.

4. The blackbody radiation source of claim 3, wherein the plurality of second carbon nanotubes comprises a first amount of carbon nanotubes and a second amount of carbon nanotubes located on different planes.

5. The blackbody radiation source of claim 4, wherein the first amount of carbon nanotubes is oriented from the first surface to the first subsurface, and the second amount of carbon nanotubes is oriented from the first surface to the second subsurface.

6. The blackbody radiation source of claim 1, wherein the first carbon nanotube layer is a free-standing structure formed by the plurality of first carbon nanotubes joined together by van der Waals attractive force therebetween.

7. The blackbody radiation source of claim 1, wherein the first carbon nanotube layer comprise at least one carbon nanotube film, at least one carbon nanotube wire, or combination thereof.

8. The blackbody radiation source of claim 1, wherein the first carbon nanotube layer defines a plurality of apertures, and the plurality of apertures extend throughout the first carbon nanotube layer along a thickness direction thereof.

9. The blackbody radiation source of claim 1, wherein a plurality of microstructures are formed on the second surface of the second carbon nanotube layer.

10. The blackbody radiation source of claim 1, wherein the plurality of third carbon nanotubes are disorderly arranged and intertwined with each other.

11. The blackbody radiation source of claim 1, wherein the plurality of third carbon nanotubes and first portions of the plurality of second carbon nanotubes which are adjacent to the first carbon nanotube layer are entangled with each other and extend around the first carbon nanotubes.

12. The blackbody radiation source of claim 1, wherein the third carbon nanotubes are entangled with both the first carbon nanotubes and the second carbon nanotubes, thus the first carbon nanotubes and the second carbon nanotubes are secured together by the third carbon nanotubes.

13. The blackbody radiation source of claim 1, wherein each of the third carbon nanotubes has a first part entangled with the first carbon nanotubes and a second part entangled with the second carbon nanotubes.

14. The blackbody radiation source of claim 1, wherein the plurality of second carbon nanotubes of the second carbon nanotube layer partially cover the first carbon nanotube layer.

15. The blackbody radiation source of claim 1, wherein the plurality of third carbon nanotubes of the third carbon nanotube layer partially cover the first carbon nanotube layer.

16. The blackbody radiation source of claim 1, wherein the plurality of second carbon nanotubes of the second carbon nanotube layer extends from the first surface to the second surface.

17. The blackbody radiation source of claim 1, wherein each of the plurality of the second carbon nanotube has an open end, and the open end is far away from the first carbon nanotube layer.

18. The blackbody radiation source of claim 1, wherein the plurality of second carbon nanotubes comprises a first amount of carbon nanotubes and a second amount of carbon nanotubes located on different planes.

19. The blackbody radiation source of claim 1, wherein the first amount of carbon nanotubes is oriented from the first surface to the first subsurface, and the second amount of carbon nanotubes is oriented from the first surface to the second subsurface.

* * * * *

UNITED STATES PATENT AND TRADEMARK OFFICE
CERTIFICATE OF CORRECTION

PATENT NO. : 11,226,238 B2  
APPLICATION NO. : 16/244481  
DATED : January 18, 2022  
INVENTOR(S) : Yang Wei, Guang Wang and Shou-Shan Fan Page 1 of 1

It is certified that error appears in the above-identified patent and that said Letters Patent is hereby corrected as shown below:

On the Title Page

Please add Item (30) "Foreign Application Priority Data":  
(30) Foreign Application Priority Data  
Jan. 11, 2018 (CN) .................. 201810027425.X Signed and Sealed this  
Thirteenth Day of September, 2022

Katherine Kelly Vidal  
*Director of the United States Patent and Trademark Office*